| (12) | United States Patent | (10) Patent No.: | US 9,227,610 B2 |
|---|---|---|---|
| | Chahal et al. | (45) Date of Patent: | Jan. 5, 2016 |

(54) VACUUM BRAKE BOOSTER VACUUM ENHANCER

(71) Applicant: FORD GLOBAL TECHNOLOGIES, LLC, Dearborn, MI (US)

(72) Inventors: Harbind S. Chahal, Novi, MI (US); Charles K. Evans, Jr., Willis, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 14/088,670

(22) Filed: Nov. 25, 2013

(65) Prior Publication Data

US 2015/0147196 A1    May 28, 2015

(51) Int. Cl.
| *B60T 13/24* | (2006.01) |
| *B60T 8/40* | (2006.01) |
| *B60T 8/32* | (2006.01) |
| *B60T 13/52* | (2006.01) |
| *B60T 17/06* | (2006.01) |
| *B60T 15/02* | (2006.01) |
| *B60T 17/02* | (2006.01) |

(52) U.S. Cl.
CPC ............ *B60T 13/241* (2013.01); *B60T 8/3265* (2013.01); *B60T 8/3275* (2013.01); *B60T 8/4077* (2013.01); *B60T 13/52* (2013.01); *B60T 15/02* (2013.01); *B60T 17/02* (2013.01); *B60T 17/06* (2013.01)

(58) Field of Classification Search
CPC ... B60T 8/3265; B60T 8/3275; B60T 8/4077; B60T 13/52; B60T 17/02
USPC ............ 123/406.69, 320; 303/114.3; 137/113
See application file for complete search history.

(56) References Cited

U.S. PATENT DOCUMENTS

| 4,554,786 | A | 11/1985 | Takeuchi et al. |
| 6,035,881 | A | 3/2000 | Emmerich et al. |
| 6,951,199 | B2 | 10/2005 | Suzuki |
| 8,360,739 | B2 | 1/2013 | Hirooka |
| 2002/0109401 | A1* | 8/2002 | Ikeda et al. ................ 303/114.3 |
| 2006/0016477 | A1 | 1/2006 | Zaparackas |
| 2007/0236083 | A1* | 10/2007 | Kawamori et al. ........ 303/114.3 |

* cited by examiner

*Primary Examiner* — Mahmoud Gimie

(74) *Attorney, Agent, or Firm* — Raymond L. Coppiellie; Brooks Kushman P.C.

(57) ABSTRACT

A vacuum enhancer having four apertures, one of which is open to the atmosphere, wherein a piston selectively restricts fluid flow through an ejector based on a pressure differential between a vacuum chamber within the vacuum booster and true atmospheric pressure.

14 Claims, 1 Drawing Sheet

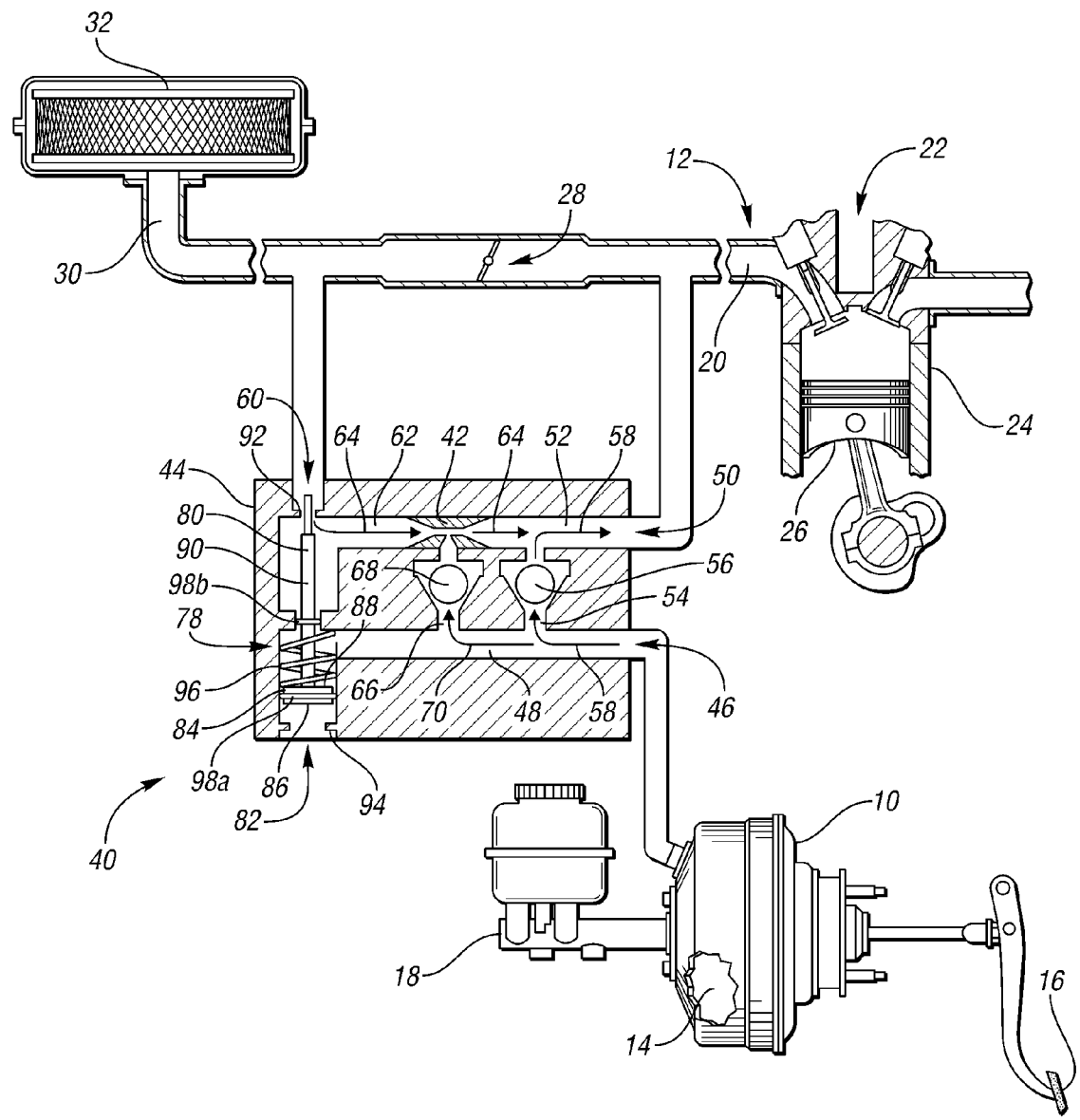

VACUUM BRAKE BOOSTER VACUUM ENHANCER

TECHNICAL FIELD

This disclosure relates to vacuum enhancers for vacuum boosters in brake systems on vehicles.

BACKGROUND

A vacuum brake booster is a component used on motor vehicles in a braking system to provide assistance to a driver by decreasing their needed braking effort to brake the vehicle. A vacuum brake booster used in a braking system may also be commonly referred to as a vacuum servo, a vacuum booster, a brake booster, or simply as a booster. A vacuum booster uses a stored vacuum to increase a braking force applied by a driver to the brake pedal before applying the transferred force to a brake master cylinder. The vacuum is typically generated in one of two distinct methods, dependent on the type of internal combustion engine, or other motive force (as in electric vehicles). In vehicles that have a naturally aspirated gasoline engines, the intake manifold is typically utilized, whereas in fully electric vehicles or vehicles with a turbo charger or diesel engines, a separate vacuum pump may often be used. In the case of a naturally aspirated gasoline engine, the vacuum booster is typically in fluid connection with cylinders of an engine and the vacuum is pulled during the engine pistons' intake strokes. The fluid connection is traditionally provided along semi-rigid plastic lines and is typically stored in the booster by using a check-valve. A check-valve, clack-valve, non-return valve or one-way valve is a valve that normally allows fluid (liquid or gas) to flow through it in only one direction, in this case toward the engine.

Vacuum boosters may also utilize a vacuum enhancer to pull a deeper vacuum within the booster than available directly from an intake manifold of an engine. A vacuum enhancer may have an ejector disposed between an inlet-duct and an intake manifold, bypassing a throttle, to allow a rush of fluid to provide a venturi effect and enhance the vacuum pulled within the booster to a deeper level. Conventional brake vacuum enhancers use a small size venturi which is always open. With these devices, the rate at which vacuum is generated by these small size venturis is very slow and continuously provides unmetered air to the engine which is not desirable.

An example of a vacuum enhancer with a closeable ejector may be seen in U.S. Pat. No. 6,035,881 to Emmerich et al, which is incorporated herein by reference.

Emmerich et al. relies on the differential pressure between the vacuum booster fitting and the intake manifold to open the ejector flow valve. The intake manifold is not at full atmospheric pressure and the intake manifold pressure varies as the air filter gets dirty. As well, if the vehicle has an intake manifold turbo charger and it spools up and pulls a vacuum onto the manifold, the pressure differential will vary even more. Varying pressure differentials to open and close the ejector path at differing times result in inconsistent performance of the device.

Emmerich et al. also relies on flexing membranes to open and close the ejector. The traditional materials used in this type of construction are rubber sheet, aramid reinforced rubber, and woven nylon, all of which may have varying stiffness changes as a function of temperature. Stiffness changes to the membrane due to age may also result in changes to the pressure differential to open and close the valve. For example, new devices in cold areas will require higher vacuum levels to open when compared to old devices operated in hot climate conditions. Varying stiffness of the membranes also results in inconsistent performance of the device

SUMMARY

One aspect of this disclosure is directed to a brake booster vacuum enhancer having a housing defining four apertures. An aperture-1 is connectable to a booster. An aperture-2 is connectable to an intake manifold. An aperture-3 is connectable to an intake air-duct. An aperture-4 is open to the atmosphere. The vacuum enhancer also have a check-valve disposed between aperture-1 and aperture-2, an ejector disposed between aperture-2 and aperture-3, and a piston disposed between aperture-3 and aperture-4 configured to selectively restrict fluid flow through the ejector based on pressure differential between aperture-1 and aperture-4.

In this aspect, the vacuum enhancer may have a piston spring disposed between aperture-3 and aperture-4 and in contact with the piston to bias the piston toward aperture-4. The pressure differential between aperture-1 and aperture-4 may be the difference between the atmosphere and a vacuum in the booster, and the piston spring may have a spring force selected to selectively restrict fluid flow through the ejector based on a predetermined vacuum level in the booster.

Another aspect of this disclosure is directed to a vacuum enhancer for a brake booster having an ejector passage, and a piston assembly to selectively restrict fluid flow through the ejector passage. The ejector passage is capable of enhancing a vacuum in the booster via a fluid connection from an intake air-duct to an intake manifold. The piston assembly has a first surface open to the atmosphere and a second surface in fluid communication with the booster. The piston assembly selectively restricts flow at a predetermined pressure differential between the first and second surfaces.

In this aspect, the piston assembly may have a spring in cooperation with the piston to bias the piston assembly in a position which allows the ejector passage to maintain a fluid connection from the intake air-duct to the intake manifold. The vacuum enhancer may have a booster passage in one-way fluid connection with the ejector passage, and fluid flow through the ejector passage provides a venturi effect on the booster passage to increase the vacuum in the booster.

A further aspect of this disclosure is directed to a vacuum enhancer for an automotive vacuum brake booster having four apertures. An aperture-1 is fluidly connectable to a vacuum booster. An aperture-2 is fluidly connectable to a vacuum source and with aperture-1. An aperture-3 is fluidly connectable to an engine intake air-duct proximate a filter and selectively fluidly connected with aperture-2. An aperture-4 is fluidly connected to the atmosphere.

In this aspect, the vacuum enhancer may use a slideable piston disposed between aperture-3 and aperture-4 selectively open and close a fluid connection between aperture-2 and aperture-3. A first portion of the piston may be in constant fluid connection with the atmosphere. An opposing surface of the piston from the atmosphere may be in constant fluid connection with aperture-1, and as such a brake booster. The vacuum source may be an engine intake manifold.

The above aspects of this disclosure and other aspects will be explained in greater detail below with reference to the attached drawings.

BRIEF DESCRIPTION OF THE DRAWINGS

FIG. 1 is a diagrammatic view of a vacuum brake booster vacuum enhancer on a vehicle.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

FIG. 1 shows a vacuum brake booster 10 for an automotive braking system in fluid communication with a vacuum source 12. A vacuum brake booster may also be referred to as a vacuum booster 10, brake booster 10, or booster 10. The vacuum source 12 pulls a vacuum on a vacuum chamber 14 to increase braking force applied by a driver to the brake pedal 16 before applying the transferred force to a master cylinder 18 for a braking system (not shown). The master cylinder 18 then sends brake fluid throughout a brake system to slow or stop a vehicle. In this embodiment, the vacuum source 12 is an intake manifold 20 connected to an engine 22. A portion of engine 22 is shown with a single cylinder 24, although the engine 22 may, and likely does, have more than one cylinder 24. An engine piston 26 moves up and down within the cylinder 24 while the engine is running, and as the engine piston 26 moves downward it may suck in air from the intake manifold 20 (however, not all downward piston movements suck in air).

Suction of air into a cylinder 24 provides a low pressure region in the intake manifold 20. The vacuum chamber 14 of the booster 10 is placed in one-way fluid communication with the intake manifold 20. Thus, the pressure within the vacuum chamber 14 will desire to equalize with the pressure in the intake manifold 20. If the vacuum chamber 14 has a higher pressure than the pressure at the intake manifold 20, the higher pressure will flow from the vacuum chamber 14 towards the intake manifold 20. This pressure flow may result in a vacuum within the vacuum chamber 14. A vacuum, as defined here, is a lower pressure than that of atmospheric pressure. The vacuum level in the vacuum chamber may be around 19 inches of mercury, although any vacuum level may be chosen. Vacuum levels are often measured in inches of mercury or millibar, although any pressure unit may be used.

The engine 22 may be any naturally aspirated engine having an engine cycle that pulls in air and may be used to pull a vacuum on the booster 10. Some examples of this include a two-stroke cycle, four-stroke cycle, or Wankel rotary engine. In the case of a vehicle that does not have an engine, or an engine incapable of providing a suitable enough suction for the desired vacuum, a vacuum pump (not shown) may also be used. The vacuum pump may be an electrically run vacuum pump powered off a battery or electric system of the vehicle, or a mechanically run vacuum pump driven off an engine, motor, or powertrain of the vehicle, or any combination of the two.

The intake air flow of an engine 22 may be metered through a throttle 28. The throttle 28 controls the amount of air flowing into engine 22, in response to the depressing of an accelerator pedal by a driver or other electronic engine controller (not shown). A throttle 28 may be a throttle body as used in fuel injected engines or a carburetor as used in non-fuel injected engines. The throttle 28 is disposed between the intake manifold 20 and an intake air-duct 30. The throttle 28 allows ambient air to flow from the intake air-duct 30 to the intake manifold 20 and into the engine 22. Since dirt or debris could damage an engine 22 if allowed to be pulled into the engine's cylinder 24, a filter 32 is placed proximate the intake air-duct 30.

Filter 32 is a screen-like material designed to filter potential damaging dirt and debris from entering the engine 22, and due to its construction, may also limit the flow of air into the intake air-duct 30. Due to this restriction, a lower pressure than atmospheric pressure may exist in the intake air-duct 30. As the filter 32 gets dirty, the inlet air flow may be restricted even further and the pressure in the intake air-duct 30 may further drop away from atmospheric pressure. The varying cleanliness of the filter 32 could result in varying pressure levels in the intake air-duct 30, especially as the filter 32 ages. As well, if the vehicle has a turbo charger (not shown), when the turbo charger spools up it can pull an even deeper vacuum on the intake air-duct, which would only be compounded by a dirty filter.

A brake booster vacuum enhancer 40 may be fluidly connected to a vacuum booster 10, vacuum source 12, and an intake air-duct 30. The vacuum enhancer 40 is designed to provide a faster achieved and/or deeper vacuum level within the vacuum chamber 14 than could be achieved by using the vacuum source 12 alone. The vacuum enhancer 40 has an ejector 42 which may be placed in series with the throttle 28. Air is allowed to flow past the throttle 28, through the ejector 42, and into the engine 22. The ejector 42 provides a Venturi effect of a converging-diverging nozzle to convert the pressure energy of a motive fluid, the air bypassing the throttle 28, to velocity energy which creates a lower pressure zone (a greater suction) than that of the intake manifold 20 resulting in a deeper vacuum within the vacuum chamber 14.

A throttle 28 is designed to meter airflow, and possibly stop the airflow all together. An unmetered bypass of the airflow from the intake air-duct 30 to the intake manifold 20 would not allow for the airflow to be fully restricted. To account for this, previous solutions may have used small ejectors to only allow a small amount of the airflow to bypass the throttle 28. Thus a way to selectively restrict fluid flow from the intake air-duct 30 to the intake manifold 20 may be desirable. As well, providing a way to restrict or stop air flow from bypassing the throttle 28 would allow for a larger ejector 42 to be used, since it will not be providing a constant air bleed, which allows for a faster rate of vacuum replenishment than a design that cannot be closed.

Vacuum enhancer 40, as illustrated in FIG. 1, has a housing 44 defining four apertures. Aperture-1 46 is connectable to a booster 10. This connection allows for a passage-1 48 within the vacuum enhancer 40 to be fluidly connectable with a vacuum chamber 14 of the booster 10. Aperture-2 50 is connectable to a vacuum source 12, shown here as an intake manifold 20. This connection allows for a passage-2 52 within the vacuum enhancer 40 to be fluidly connectable with the vacuum source 12. A fluid connection within the vacuum enhancer is provided between aperture-1 46 and aperture-2 50; passage-1 48 is fluidly connected to passage-2 52 through a first check-valve passage 54. A first check-valve 56 is disposed within passage-3 62 to allow fluid flow to move in single direction from passage-1 48 to passage-2 52. The first check-valve 56 is disposed between aperture-1 46 and aperture-2 50.

A fluid flow path from aperture-1 46 into passage-1 48, through check-valve passage 54 (past the first check-valve 56), into passage-2 52 and out aperture-2 50 may be referred to as a first booster passage, as indicated by arrows 58. This passage is a non-enhanced one-way flow path through the vacuum enhancer 40 from the vacuum chamber 14 of the booster 10 to the vacuum source 12.

Aperture-3 60 is connectable to an intake air-duct 30. This connection allows for a passage-3 62 within the vacuum enhancer 40 to be fluidly connectable with the vacuum source 12. Passage-3 62 is fluidly connected to passage passage-2 52 through an ejector 42. A fluid flow path from into aperture-3 60 and passage-3 62, through the ejector 42, into passage-2 52, and out passage-2 50 may be referred to as an ejector passage, as indicted by arrows 64. Fluid flow through the ejector 42 causes a Venturi effect to occur producing lower pressure zone in a second check-valve passage 66 containing a second check-valve 68. The second check-valve passage 66 is in fluid communication with passage-1 48 and aperture-1 46 which is connectable to the vacuum chamber 14 of the booster 10. The venturi effect of the ejector 42 may then provide a deeper vacuum level within the vacuum chamber 14 than the direct suction the vacuum source 12 may provide by itself.

A flow path from aperture-1 46 into passage-1 48, through the second check-valve passage 66 (past the second check-valve 68), into passage-2 52 and out aperture-2 50 may be referred to as a second booster passage, as indicated by arrow 70. This passage is an enhanced one-way flow path through the vacuum enhancer 40 from the vacuum chamber 14 to the vacuum source 12. Thus fluid flow through ejector passage 64 is capable of enhancing a vacuum in the booster 10 by providing a fluid flow through the second booster passage 70. Like the first check-valve 56, the second check-valve 68 is also disposed between aperture-1 46 and aperture-2 50, the first check-valve 56 being disposed in the first booster passage 58 and the second check-valve 68 being disposed in the second booster passage 70 such that only one-way pressure flow is allowed to occur from the vacuum chamber 14, and once the vacuum chamber 14 is pulled into a vacuum deeper than the pressure differential can unseat a check-valve 56, 68, then the check-valves 56, 68 maintain the vacuum within the vacuum chamber 14.

As mentioned above, it is desirable to be able to close off fluid flow which bypasses the throttle 28, and a piston assembly 78 is disposed within the vacuum enhancer 40 to selectively restrict fluid flow through the ejector 42. A piston 80 is disposed between aperture-3 60 and an aperture-4 82 which is open to the atmosphere. The piston 80 has a first portion 84 with a first surface 86 open to the atmosphere. The first portion 84 of the piston 80 also has a second surface 88 which opposes the first surface 86 and is in fluid communication with passage-1 48, aperture-1 46, and the booster 10 when connected. The piston 80 has a second portion 90 which extends from the first portion 84, through an area in fluid communication with passage-1 48 and into an area in fluid communication with passage-3 62 toward aperture-3 60. The piston 80 is slideable between aperture-4 82 and aperture-3 60 such that the second portion 90 is capable of providing the selective fluid connection between aperture-2 50 and aperture-3 60. The piston 80 is configured to selectively restrict flow through the ejector 42 based on a pressure differential between aperture-1 46, which may be in fluid communication with the vacuum chamber 14 in the booster 10 and aperture-4 82 which is open to the atmosphere. The piston 80 is configured to selectively restrict flow through the ejector 42 at a predetermined pressure differential between the first and second surfaces 86, 88.

The vacuum enhancer 40 may also define first and second piston stops 92, 94 at or near aperture-3 60 and aperture-4 82, respectively, to retain the piston 80 within the vacuum enhancer 40. The first piston stop 92 may also work in conjunction with the second portion 90 of the piston 80 to seal off the fluid flow through the ejector 42, when the piston 80 is seated against the stop 92. A piston spring 96 may also be disposed around the piston 80 and between aperture-3 60 and aperture-4 82 and in contact with the piston 80 to bias the piston 80 toward aperture-4 82. The piston spring 96 has a spring force specifically chosen to cooperate with the pressure differential between the a vacuum chamber 14 and the atmosphere to restrict fluid flow from entering aperture-3 60 at a predetermined vacuum level within the booster 10.

The piston 80 size and the spring force may be set at different values to actuate the shutoff at whatever level of vacuum is desired for the application. For example, a piston 80 having a first surface area of approximately 314 $mm^2$ (open to the atmosphere), a cross-section area of the second portion 90 of approximately 80 $mm^2$ (leaving a second surface having a 234 $mm^2$ surface area open to the vacuum chamber 14) and a spring force of 3.38 lbs. may allow for the piston 80 to substantially close off aperture-3 60 when the vacuum chamber 14 is at approximately 19 inches of mercury.

In other words, when the booster 10 is at its optimal vacuum level, the pressure differential causes the atmospheric pressure to push against the piston spring 96 closing aperture-3 60. If the vacuum level within the booster 10 falls away from the predetermined level, then the pressure differential between the booster 10 and the atmosphere becomes less, the piston spring 96 pushes the piston 80 toward aperture-4 82 opening aperture-3 60 allowing fluid flow to rush through the ejector 42 and pull a deeper vacuum in the booster 10 before closing once again.

At least one O-ring 98 may be disposed around the piston 80 to restrict fluid flow between aperture-3 60 and aperture-4 82. At least one O-ring 98a may be disposed around the first portion 84 between the first and second surfaces 86, 88 to provide a seal between aperture-1 46 and aperture-4 82. More than one O-ring 98a may be employed. O-ring(s) 98a substantially prevent pressure blow-through from the atmosphere into the booster 10. A second O-ring 98b may be disposed around the second portion 90 of the piston 80 between passage-1 48 and passage-3 62 to provide a seal between the two. More than one O-ring 98b may be employed. O-ring(s) 98b substantially prevent pressure blow-through from the intake air-duct 30 into the booster 10.

As illustrated, the vacuum enhancer 40 allows fluid flow through the ejector 42 providing a Venturi effect to pull a faster and deeper vacuum within the booster 10 when there is a need for a vacuum in the booster 10. When the predetermined vacuum level is reached within the booster 10, the piston 80 restricts fluid flow through the ejector 42. This enables this device to use a larger ejector 42 to produce a larger Venturi effect to pull a vacuum at much higher rate than allowing the ejector passage to remain open at all times.

This design does not use a pressure differential between the vacuum chamber 14 of the booster 10 and the intake air-duct 30, because the intake air-duct 30 in most vehicles may not be at full atmospheric pressure or may have varying pressures. Having the vacuum level within the booster 10 based on a varying pressure differential will result in varying vacuum levels within the booster 10. Pressures within the inlet air-duct 30 will drop as the air filter 32 gets dirty, or if a turbo charger spools up if the vehicle is so equipped.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A brake booster vacuum enhancer comprising:
   a housing defining an aperture-1 connectable to a booster, an aperture-2 connectable to an intake manifold, an aperture-3 connectable to an intake air-duct, and an aperture-4 open to the atmosphere;
   a check-valve disposed between aperture-1 and aperture-2;
   an ejector disposed between aperture-2 and aperture-3; and
   a piston disposed between aperture-3 and aperture-4 configured to selectively restrict fluid flow through the ejector based on pressure differential between aperture-1 and aperture-4, having a first portion in fluid communication with aperture-1, a second portion in fluid communication with aperture-3, and a seal between aperture-1 and aperture-3.

2. The vacuum enhancer of claim 1 further comprising a piston spring disposed between aperture-3 and aperture-4 and in contact with the piston to bias the piston toward aperture-4.

3. The vacuum enhancer of claim 2 wherein the pressure differential between aperture-1 and aperture-4 is the difference between the atmosphere and a vacuum in the booster, and the piston spring has a spring force selected to selectively restrict fluid flow through the ejector based on a predetermined vacuum level in the booster.

4. The vacuum enhancer of claim 1 further comprising at least one O-ring disposed around the piston to restrict fluid flow between aperture-3 and aperture-4.

5. A vacuum enhancer for an automotive vacuum brake booster comprising:
   an aperture-1 fluidly connectable to a vacuum booster;
   an aperture-2 fluidly connectable to a vacuum source and fluidly connected with aperture-1;
   an aperture-3, defining a first piston stop, fluidly connectable to an engine intake air-duct proximate a filter and selectively fluidly connected with aperture-2; and
   an aperture-4, defining a second piston stop, fluidly connected to the atmosphere.

6. The vacuum enhancer of claim 5 further comprising a piston disposed between aperture-3 and aperture-4, wherein the piston is slideable such that a second portion of the piston is capable of providing the selective fluid connection between aperture-2 and aperture-3.

7. The vacuum enhancer of claim 6 wherein a first portion of the piston is in constant fluid connection with the atmosphere.

8. The vacuum enhancer of claim 7 wherein the first portion of the piston has first and second opposing surfaces, the first surface being in constant fluid connection with the atmosphere and the second surface being fluidly connected with aperture-1.

9. The vacuum enhancer of claim 8 wherein at least one O-ring is disposed on the first portion of the piston between the opposing surfaces to provide a seal between aperture-4 and aperture-1.

10. The vacuum enhancer of claim 6 further comprising a piston spring in cooperation with the piston to bias the piston in a position to allow fluid connection between aperture-2 and aperture-3.

11. The vacuum enhancer of claim 5 further comprising a first flow path fluidly connecting aperture-3 with aperture-2 having an ejector section disposed within the first flow path.

12. The vacuum enhancer of claim 11 further comprising a second flow path fluidly connecting aperture-1 with aperture-2, wherein the fluid flow is constrained to flow from aperture-1 to aperture-2.

13. The vacuum enhancer of claim 11 further comprising a third flow path fluidly connecting aperture-1 with aperture-2, wherein the fluid flow is constrained to flow from aperture-1 to aperture-2 and joins the first flow path at the ejector.

14. The vacuum enhancer of claim 5 wherein the vacuum source is an engine intake manifold.

\* \* \* \* \*